Oct. 2, 1962    G. M. SISSON    3,056,331
PHOTOGRAPHIC PLATE OR FILM MEASURING DEVICES
Filed June 7, 1961
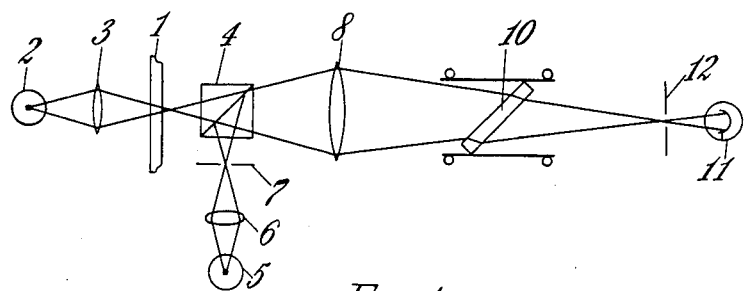
Fig. 1.
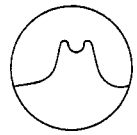  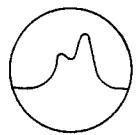
Fig. 2.           Fig. 3.

United States Patent Office 3,056,331
Patented Oct. 2, 1962

3,056,331
PHOTOGRAPHIC PLATE OR FILM MEASURING DEVICES
George M. Sisson, Newcastle-Upon-Tyne, England, assignor to Sir Howard Grubb Parsons & Company Limited, Newcastle-Upon-Tyne, England
Filed June 7, 1961, Ser. No. 115,542
Claims priority, application Great Britain June 15, 1960
3 Claims. (Cl. 88—14)

This invention relates to photographic plate or film measuring devices.

Such devices usually comprise means for moving a photographic plate or film in one or two directions in the plane of the emulsion layer. Marks in the emulsion, for example star images or spectral lines in the case of photographic plates or film used in conjunction with telescopes, are then observed by an optical system giving magnification and the plate or film is moved to bring the mark into alignment with a fixed fiducial mark.

The amount of movement of the film or plate is then measured by some means, for example, by counting the revolutions or part revolutions of a screw imparting movement to the plate or film.

Devices of this kind impose on the operator the need for making continual judgements of the position at which the fiducial mark accurately bisects the mark in the emulsion layer and this is often difficult and tiring.

In our co-pending patent application No. 82,349 January 12, 1961, we describe a device which gives the operator a simple criterion for this bisection.

In the device described in the aforesaid application means are provided for focussing an image of a mark, in a transparent or translucent plate or film, on an apertured diaphragm and further means are provided for producing relative rotation between the image and the diaphragm about a fixed axis passing through the diaphragm. A photosensitive device is placed to receive light passing through the apertured diaphragm, which device produces a signal when the beam of light from the plate passes through an aperture in the diaphragm. Means are also provided for producing a reference signal at a chosen relative angular position of the diaphragm and image and the times of the reference signal and the signal from the photosensitive device are compared, for example, on an oscilloscope. The arrangement is such that by adjusting the position of the mark in the transparent plate or film relative to the rest of the measuring device the two elecrical signals produced can be made to occur simultaneously. Various embodiments of the device are described including various ways of producing the reference signal.

It is important, however, in such devices that the axis, about which relative rotation between the image and the diaphragm takes place, should remain fixed for each reading, otherwise errors are introduced.

If the diaphragm remains fixed and the image is rotated about a fixed axis in the diaphragm by means of a rotating transparent plate, errors may be induced due to wear in the bearings in which the plate rotates and the resultant occurrence of changes in the axis of rotation of the plate and the image. Means are described in the aforesaid application to correct for such errors, for example, by inclining the beam from the plate at an angle to the apertures in the diaphragm. Apart from such errors, however temperature effects may also produce errors and compensation must be made for these.

The object of the present invention is therefore to provide a device in accordance with the aforesaid co-pending application No. 82,349, in which these errors can be substantially eliminated in a simple and convenient way.

The invention consists in a device for determining the position of a mark in a transparent or translucent plate or film, for example, a mark formed in a photographic emulsion by a photographed object which device comprises means for illuminating the mark, means for producing an image thereof on an apertured diaphragm, means to produce relative rotation betwen the image and the diaphragm about a fixed axis passing through the diaphragm, a photosensitive device receiving light through the diaphragm to produce an electrical signal when the image falls upon an aperture in the diaphragm, means for producing a reference signal in the form of a fixed optical image superimposed upon the optical image of the mark on the photographic plate or film, these two images both being formed by light which is passed through the means for producing relative rotation between the images and the apertured diaphragm, and means for comparing the times of the signal from the photosensitive device at which these two superimposed images fall upon the photosensitive device.

The invention also consists in a device in accordance with the preceding paragraph in which the beams of light from the plate or film and the reference beam are directed onto a beam splitting device from different angles as superimposed beams before falling on a rotating transparent plate which produces lateral displacement of both beams and causes them to move in a loop about the axis of rotation of the plate, the beams being thence directed onto an apertured fixed diaphragm and thence onto a photosensitive device receiving light through the apertured diaphragm.

The invention also consists in a device in accordance with the preceding paragraph in which when the mark in the transparent plate or film appears as a bright patch on a dark background a graticule is interposed into the reference to produce a beam having a dark patch on a light background.

The invention also consists in a device substantially as hereinafter described with reference to the accompanying diagrammatic drawings.

The invention will now be described, by way of example, with reference to the diagrammatic drawings accompanying the specification in which:

FIGURE 1 shows an arrangement according to the present invention,

FIGURE 2 shows the correct position of trace of a signal produced in an oscilloscope by the arrangement shown in FIGURE 1, and FIGURE 3 shows an incorrect position of the trace of a signal produced on an oscilloscope by the arrangement shown in FIGURE 1.

Referring firstly to FIGURE 1 a photographic plate or film 1 has an emulsion film on which appears a series of marks or areas representing images of photographed objects. The mark may, for example, be a star image or spectral line such as is obtained with photographic plates used with telescopes. The mark may be a bright patch on a dark background or a dark patch on a bright background. For the purposes of the present description it is assumed that it is a dark patch on a bright background.

The mark is illuminated by a lamp 2 and condensing lens 3. The beam emerging from the plate 1 is directed onto a beam splitting device 4 which may be in the form of two prisms having a semireflecting surface at their mating surface. A reference beam from lamp 5 is directed through a lens 6 and pin hole 7 onto the beam splitting device 4 at an angle to the beam from the plate 1. The two beams emerge from the beam splitting device 4 superimposed one upon the other and then pass through a projection lens 8, onto a rotating transparent plate 10 disposed at an angle to the beams so as to displace them laterally but still superimposed. As the plate 10 rotates the superimposed beams move in a loop about the axis of rotation of the plate. Interposed between the plate 10 and a photosensitive device 11 is a fixed apertured diaphragm 12 which receives the superimposed beams from the plate 10. When the fixed optical image of pinhole 7 and the optical image of the mark coincide with an aperture the light passes through and falls on photosensitive device 11 which produces an electrical signal.

The signals from the photosensitive device are displayed on a cathode ray oscilloscope and from the relative position of the traces of the signals due to the reference beam pinhole 7 and the star image or mark in the photographic plate or film it is possible to determine when the two are exactly coincident.

FIGURE 2 shows the correct position of the signal of the trace appearing on the oscilloscope for exact coincidence of the images of the mark in the photographic plate and the image of pinhole 7.

FIGURE 3 shows how the signal would appear if there was not exact coincidence.

Whilst the invention will work irrespective of whether the mark on the emulsion of the photographic plate or film appears as a bright patch on a dark background or vice versa in the case where the mark is a bright patch on a dark background a graticule may be interposed into the reference beam to produce a beam having a dark patch on a bright background.

With the arrangement according to the invention the fact that the beams are superimposed one upon the other means that any wear on the bearings supporting the rotating plate 10 or any temperature effects affect both beams equally.

As in our co-pending application No. 82,349, the relative rotation between the images and the apertured diaphragm can be achieved by rotating the images as described or by rotating the apertured diaphragm.

It will be appreciated that the foregoing details are given by way of example only and that any desired modifications, within the scope of the appended claims, may be made to the invention in order to suit varying requirements.

What I claim is:

1. A device for determining the position of a mark in a transparent or translucent plate or film, for example, a mark formed in a photographic emulsion by a photographed object which device comprises means for illuminating the mark, means for focussing an image thereof on an apertured diaphragm, means to produce relative rotation between the image and the diaphragm about a fixed axis passing through the diaphragm, a photosensitive device receiving light through the diaphragm to produce an electrical signal when the image falls upon an aperture in the diaphragm, means for producing a reference signal in the form of a fixed optical image superimposed upon the optical image of the mark on the photographic plate or film, these two images both being formed by light which is passed through the means for producing relative rotation between the images and the apertured diaphragm, and means for comparing the times of the signals from the photosensitive device at which these two superimposed images fall upon the photosensitive device.

2. A device as claimed in claim 1 in which the beams of light from the plate or film and the reference beam are directed onto a beam splitting device from different angles and emerge therefrom as superimposed beams before falling on a rotating transparent plate which produces lateral displacement of both beams and causes them to move in a loop about the axis of rotation of the plate, the beams being thence directed onto an apertured fixed diaphragm and thence onto a photosensitive device receiving light through the apertured diaphragm.

3. A device as claimed in claim 2 in which when the mark in the transparent plate or film appears as a bright patch on a dark background a graticule is interposed into the reference to produce a beam having a dark patch on a light background.

No references cited.